(12) United States Patent
Hirose

(10) Patent No.: US 10,890,754 B2
(45) Date of Patent: Jan. 12, 2021

(54) OBSERVATION OPTICAL SYSTEM

(71) Applicant: Konica Minolta, Inc., Tokyo (JP)

(72) Inventor: Naoki Hirose, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 74 days.

(21) Appl. No.: 16/463,837

(22) PCT Filed: Dec. 7, 2017

(86) PCT No.: PCT/JP2017/044099
§ 371 (c)(1),
(2) Date: May 23, 2019

(87) PCT Pub. No.: WO2018/105710
PCT Pub. Date: Jun. 14, 2018

(65) Prior Publication Data
US 2019/0331909 A1 Oct. 31, 2019

(30) Foreign Application Priority Data
Dec. 9, 2016 (JP) .................. 2016-239531

(51) Int. Cl.
*G02B 25/00* (2006.01)
(52) U.S. Cl.
CPC .......... *G02B 25/002* (2013.01); *G02B 25/001* (2013.01)
(58) Field of Classification Search
CPC .... G02B 25/002; G02B 25/001; G02B 7/002; G02B 13/08; G02B 13/09; G02B 13/10;
(Continued)

(56) References Cited

U.S. PATENT DOCUMENTS

| 4,906,078 A * | 3/1990 | Inabata | G02B 13/12 359/422 |
| 5,257,129 A * | 10/1993 | Morooka | G02B 15/16 359/432 |

(Continued)

FOREIGN PATENT DOCUMENTS

| JP | H09218358 A | 8/1997 |
| JP | 2012252241 A | 12/2012 |

(Continued)

OTHER PUBLICATIONS

International Search Report dated Mar. 13, 2018 filed in PCT/JP2017/044099.

(Continued)

*Primary Examiner* — William R Alexander
*Assistant Examiner* — Tamara Y. Washington
(74) *Attorney, Agent, or Firm* — Rankin, Hill & Clark LLP

(57) ABSTRACT

An observation optical system 10 is provided with an objective optical system LO, an inversion optical system PR provided in the objective optical system LO or immediately posterior to the objective optical system LO to invert an inverted image to an erected image, and an eyepiece optical system LE arranged so as to be the closest to a pupil EP to observe the erected image, the observation optical system satisfying following conditional expressions $1.6 < f \times N/L < 2.5$ ... (1) and $|D/H| < 3$ ... (2) Herein, a value f represents a focal length of the objective optical system LO, a value N represents a refractive index on a d-line of the inversion optical system PR, a value L represents an optical path length of the inversion optical system PR, a value D represents a maximum height from an optical axis AX in an incident light ray on the object side of the inversion optical system PR, and a value H represents an exit pupil radius.

11 Claims, 4 Drawing Sheets

(58) Field of Classification Search
CPC ........ G02B 13/11; G02B 13/12; G02B 15/14; G02B 21/20; G02B 21/0012; G02B 23/00; G02B 25/00
USPC .......................................................... 359/643
See application file for complete search history.

(56) References Cited

U.S. PATENT DOCUMENTS

| | | | | |
|---|---|---|---|---|
| 5,576,888 | A * | 11/1996 | Betensky | G02B 23/00 359/676 |
| 5,623,364 | A * | 4/1997 | Morooka | G02B 27/646 359/554 |
| 5,687,023 | A * | 11/1997 | Ohshita | G02B 15/177 359/422 |
| 5,966,244 | A * | 10/1999 | Mukai | G02B 25/001 359/565 |
| 6,034,816 | A * | 3/2000 | Kang | G02B 15/177 359/432 |
| 6,094,310 | A * | 7/2000 | Hankawa | G02B 25/001 359/643 |
| 6,154,314 | A * | 11/2000 | Takahashi | G02B 15/173 359/431 |
| 6,577,449 | B1 * | 6/2003 | Kanai | G02B 15/163 359/421 |
| 8,896,927 | B2 | 11/2014 | Saito | |
| 9,709,780 | B2 * | 7/2017 | Jin | G02B 23/00 |
| 9,835,871 | B2 | 12/2017 | Miyazaki | |
| 9,869,850 | B2 * | 1/2018 | Jin | G02B 27/0025 |
| 2004/0095642 | A1 * | 5/2004 | Watanabe | G02B 7/06 359/407 |
| 2014/0139913 | A1 | 5/2014 | Saito | |
| 2016/0124243 | A1 | 5/2016 | Miyazaki | |
| 2017/0357085 | A1 | 12/2017 | Nishida | |

FOREIGN PATENT DOCUMENTS

| | | |
|---|---|---|
| JP | 2016166907 A | 9/2016 |
| JP | 2017219742 A | 12/2017 |
| WO | 2013024576 A1 | 2/2013 |

OTHER PUBLICATIONS

Written Opinion of the International Searching Authority (Form PCT/ISA/237) dated Mar. 13, 2018 filed in PCT/JP2017/044099; English translation.

* cited by examiner

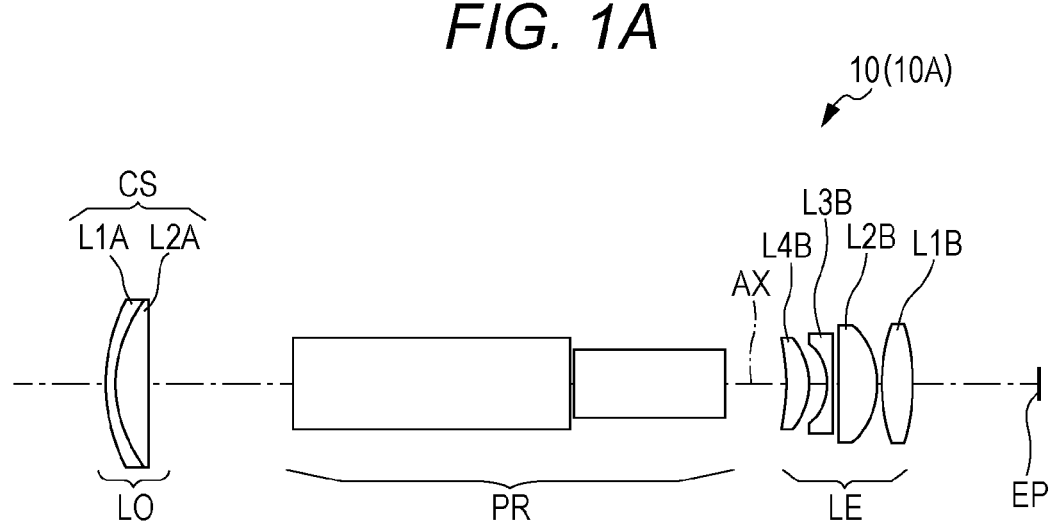
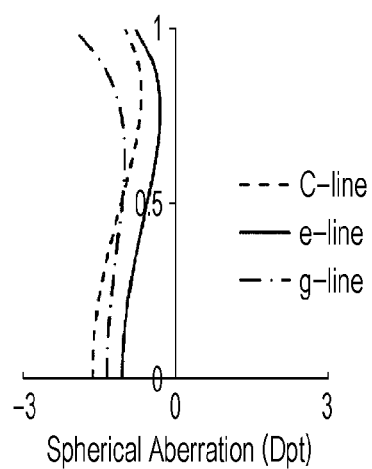
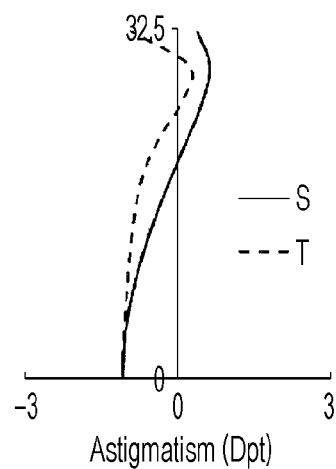
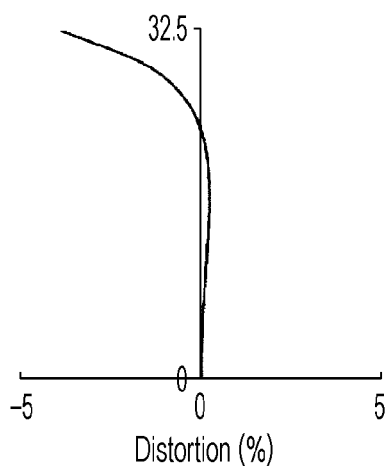

Spherical Aberration (Dpt)

Astigmatism (Dpt)

Distortion (%)

OBSERVATION OPTICAL SYSTEM

TECHNICAL FIELD

The present invention relates to an observation optical system which may be used for, for example, a medical loupe, a working loupe and the like.

BACKGROUND ART

An observation optical system referred to as Kepler type, that is, that primarily forms an image of an object image as an erected image through an objective optical system and an inversion optical system and makes the image observable by an eyepiece optical system is conventionally generally put into practical use (for example, refer to Patent Literature 1).

However, the observation optical system in Patent Literature 1 includes a relatively small number of lenses, but this sacrifices miniaturization and weight saving in order to widen an apparent field of view.

CITATION LIST

Patent Literature

Patent Literature 1: JP H09-218358 A

SUMMARY OF INVENTION

The present invention is achieved in view of the above-described background art, and an object thereof is to provide a compact and lightweight observation optical system.

In order to realize at least one of the above-described objects, an observation optical system reflecting an aspect of the present invention is provided with an objective optical system, an inversion optical system provided in the objective optical system or immediately posterior to the objective optical system to invert an inverted image to an erected image, and an eyepiece optical system arranged so as to be the closest to a pupil to observe the erected image, and satisfies following conditional expressions.

$$1.6 < f \times N/L < 2.5 \quad (1)$$

$$|D/H| < 3 \quad (2)$$

Herein, a value f represents a focal length of the objective optical system, a value N represents a refractive index on a d-line of the inversion optical system, a value L represents an optical path length of the inversion optical system, a value D represents a maximum height from an optical axis in an incident light ray on the object side of the inversion optical system, and a value H represents an exit pupil radius. The unit of the values f, L, D, and H is millimeter.

BRIEF DESCRIPTION OF DRAWINGS

FIG. 1A is a cross-sectional view for illustrating an observation optical system and the like according to one embodiment and a first example of the present invention, and FIGS. 1B to 1D are aberration diagrams of the observation optical system of the first example.

DESCRIPTION OF EMBODIMENTS

Hereinafter, an observation optical system 10 according to one embodiment of the present invention is described with reference to FIG. 1A. Note that the observation optical system 10 illustrated in FIG. 1A has the same configuration as that of an observation optical system 10A in a first example to be described later.

As illustrated in FIG. 1A, the observation optical system 10 being a real image single focus optical system is provided with an objective optical system LO, an inversion optical system PR, and an eyepiece optical system LE in this order from an object side. The observation optical system 10 is fixed to a lens tube and the like not illustrated and is used for a medical loupe, a working loupe and the like. In a case where the observation optical system 10 is applied to the loupe, this may be an eyeglass type or a head mounted type so that work with both hands may be performed.

Out of the observation optical system 10, the objective optical system LO condenses light fluxes to produce a real image. In an example in FIG. 1A, the objective optical system LO is formed of a first A lens L1A having a negative power and a second A lens L2A having a positive power in this order from the object side. In the objective optical system LO, the first A lens L1A and the second A lens L2A are cemented to form a cemented lens CS. As a result, it is possible to excellently correct magnification chromatic aberration. The cemented lens CS has a positive power as a whole. The first A lens and second A lens L1A and L2A are spherical lenses and are made of glass, for example.

The inversion optical system PR erects an inverted image formed by the objective optical system LO. As the inversion optical system PR, a prism and the like is used, for example. In the example in FIG. 1A, the inversion optical system PR formed of two glass prisms is illustrated in a developed state. The inversion optical system PR is arranged immediately posterior to the objective optical system LO, that is, on a pupil EP side of the cemented lens CS.

Figure 2A:
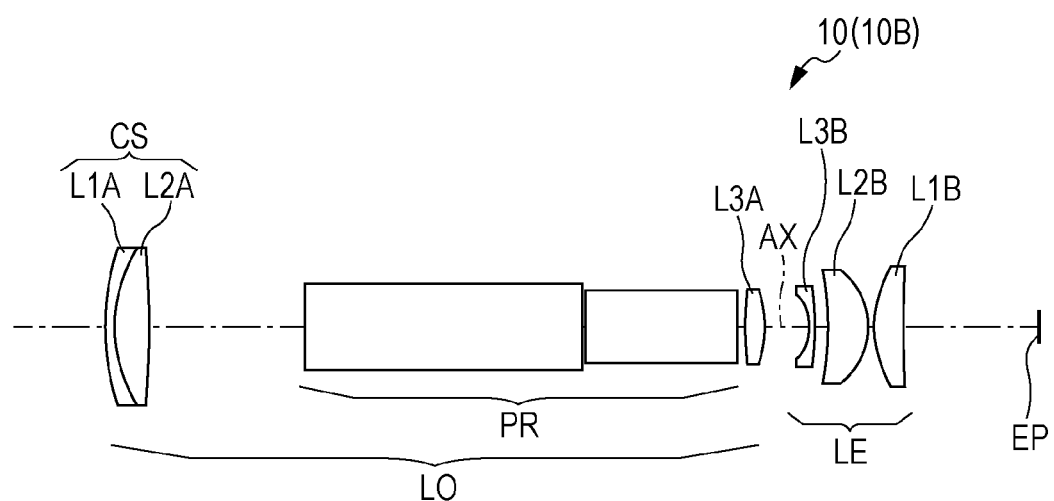
FIG. 2A is a cross-sectional view illustrating an observation optical system and the like of a second example.

Note that the objective optical system LO may also be formed of three or more lenses (refer to FIG. 2A and the like). In a case where the objective optical system LO is formed of three or more lenses, the inversion optical system PR may be arranged inside the objective optical system LO, that is, between the lenses forming the objective optical system LO.

The eyepiece optical system LE is configured such that an erected image formed by the inversion optical system PR is observed by a human eye through the pupil EP. The eyepiece optical system LE is arranged posterior to an intermediate image as seen from the object side. The eyepiece optical system LE includes a positive lens, a positive lens, and a negative lens in this order from the pupil EP side. In the example in FIG. 1A, the eyepiece optical system LE is formed of four lenses; this is specifically formed of a first B lens L1B having a positive power, a second B lens L2B having a positive power, a third B lens L3B having a negative power, and a fourth B lens L4B having a positive power in this order from the pupil EP side. With such a lens configuration, it is possible to obtain an action of securing a long eye relief by increasing a light ray height inside the eyepiece optical system LE by a diverging action of the negative lens on the object side (specifically, the third B lens L3B) and excellently correct curvature of image and comma aberration by the two positive lenses on the pupil EP side (specifically, the first B lens L1B and second B lens L2B). Note that, in the eyepiece optical system LE, the lens the closest to the pupil EP (specifically, the first B lens L1B) desirably includes an aspheric surface. As a result, the curvature of image may be excellently corrected to a periphery of a range of vision. Therefore, a difference between central dioptric power and peripheral dioptric power may be made small, and an effect of reduction in depth of field due to high magnification may be made small. The first to fourth B lenses L1B to L4B are made of glass, for example. Note that, as illustrated in FIG. 2A and the like, the eyepiece optical system LE may be formed of three lenses; specifically the first B lens L1B having the positive power, the second B lens L2B having the positive power, and the third B lens L3B having the negative power in this order from the pupil EP side.

The observation optical system 10 satisfies following conditional expressions (1) and (2).

$$1.6 < f \times N/L < 2.5 \qquad (1)$$

$$|D/H| < 3 \qquad (2)$$

Herein, a value f represents a focal length of the objective optical system LO, a value N represents a refractive index on a d-line of the inversion optical system PR, a value L represents an optical path length of the inversion optical system PR, a value D represents a maximum height from an optical axis AX in an incident light ray on the object side of the inversion optical system PR, and a value H represents an exit pupil radius. The unit of the values f, L, D, and H is millimeter.

Conditional expression (1) expresses a ratio between a focal length of the lens the closest to the object (specifically, the first A lens L1A of the objective optical system LO) (approximately, a distance between the lens the closest to the object and a substantially intermediate image) and an air-converted optical path length of the inversion optical system PR. When this is higher than a lower limit of the value f×N/L in conditional expression (1), the optical path length of the inversion optical system PR is not too long and an air space between the lens the closest to the object and the inversion optical system PR is moderately large, and the height of the incident light ray of the inversion optical system PR is not too high and the inversion optical system PR may be made relatively small. Also, the focal length of the objective optical system LO is not too short and a focal length of the eyepiece optical system LE is not required to be short in order to obtain desired magnification, so that aberration correction in the eyepiece optical system LE formed of a small number of lenses becomes easy. In contrast, when this is lower than an upper limit of the value f×N/L in conditional expression (1), the focal length of the objective optical system LO is not become too long, and miniaturization and weight saving of an entire observation optical system 10 may be achieved. Conditional expression (2) defines the incident light ray height of the inversion optical system PR with respect to a practical pupil diameter. By satisfying the value |D/H| in the conditional expression (2), the inversion optical system PR does not become large and the miniaturization and weight saving of the entire observation optical system 10 may be achieved.

In addition to conditional expressions (1) and (2) described above, the observation optical system 10 desirably satisfies following conditional expressions (3) and (4).

$$1.64 < Nd < 1.85 \qquad (3)$$

$$20 < vd < 34 \qquad (4)$$

Herein, the value Nd is a refractive index of a glass material used for the inversion optical system PR with respect to a d-line, and the value vd is the Abbe number of the inversion optical system PR.

The inversion optical system PR (for example, the prism) utilizes total reflection in which light rays incident on a medium having a low refractive index from a medium having a high refractive index do not pass through a boundary surface but are totally reflected. However, when it is tried to realize the miniaturization of the inversion optical system PR, an incident angle of peripheral light rays on the boundary surface becomes small, so that it is necessary to appropriately set a refractive index range so as to satisfy a total reflection condition. Also, it is necessary to increase the refractive index in order to decrease a total reflection angle, and it is important to select a glass material having a small specific gravity in order to save the weight of the inversion optical system PR. The two requirements may be achieved if conditional expressions (3) and (4) are satisfied.

In addition to conditional expressions (1) and (2) or (1) to (4) described above, the observation optical system 10 satisfies following conditional expression (5).

$$4 < f/f_R < 7.5 \qquad (5)$$

Herein, the value f represents the focal length of the objective optical system LO, and a value $f_R$ represents the focal length of the eyepiece optical system LE.

Since the miniaturization and weight saving are important for the medical loupe and the working loupe, it is possible to achieve the miniaturization while securing high magnification by setting a ratio between the objective optical system LO and the eyepiece optical system LE as expressed in conditional expression (5). When this is higher than a lower limit of the value $f/f_R$ of conditional expression (5), it is possible to achieve the miniaturization and weight saving while appropriately securing the loupe magnification. In contrast, when this is lower than an upper limit of the value $f/f_R$ of conditional expression (5), the miniaturization and weight saving may be surely achieved.

In the observation optical system 10 described above, the size of the inversion optical system PR which occupies about the half of the entire observation optical system 10 is a point from the viewpoint of miniaturization and weight saving. Therefore, it is necessary to control the height of the light ray incident on the inversion optical system PR from the object side to be low. In this observation optical system 10, the incident light ray height is decreased by securing a relatively large air space between the lens the closest to the object of the objective optical system LO (specifically, the first A lens L1A of the objective optical system LO) and the inversion optical system PR. Note that, when the air space is made too large, a distance between a position of the intermediate image and an exit surface of the inversion optical system PR becomes short, and dust or the like stuck on a surface of the inversion optical system PR is undesirably visible to an observer. This observation optical system 10 is effective for a loupe or the like which must be attached or held for a long time.

EXAMPLES

Hereinafter, examples of the observation optical system according to the present invention are described. Symbols used in each example are as follows.

R: paraxial curvature radius

T: axial surface distance

Nd: refractive index of lens material with respect to d-line vd: Abbe number of lens material In addition, a symbol "Surf.N" means a surface number, a symbol "INF" means infinity or ∞, and a symbol "EP" means a pupil. Also, in each example, a surface with "*" after each surface number is a surface having an aspherical shape, and the aspherical shape is expressed by following "Mathematical Expression 1" with an apex of the surface being an origin, an X axis being taken in an optical axis direction, and a height in a direction perpendicular to the optical axis being h.

$$X = \frac{h^2/R}{1 + \sqrt{1 - (1+K)h^2/R^2}} + \sum A_i h^i \quad \text{[Mathematical Expression 1]}$$

wherein, $A_i$: i-th order aspherical coefficient

R: reference radius of curvature

K: conical constant

First Example

Optical specification values of an observation optical system of a first example are illustrated in following Table 1.

TABLE 1

| | |
|---|---|
| DIOPTER (dpt) | −1.0 |
| OBJECT DISTANCE (mm) | 390 |
| PUPIL RADIUS H (mm) | 1.75 |

Data of a lens surface and the like of the observation optical system of the first example are illustrated in following Table 2.

TABLE 2

| Surf. N | R (mm) | T (mm) | Nd | vd |
|---|---|---|---|---|
| 1 | 22.953 | 0.850 | 1.90366 | 31.36 |
| 2 | 14.153 | 3.551 | 1.65844 | 50.86 |
| 3 | −2680.269 | 15.723 | | |
| 4 | INF | 30.170 | 1.72825 | 28.32 |
| 5 | INF | 0.520 | | |
| 6 | INF | 16.130 | 1.72825 | 28.32 |
| 7 | INF | 6.678 | | |
| 8 | −24.890 | 2.453 | 1.90366 | 31.36 |
| 9 | −7.838 | 2.055 | | |
| 10 | −5.370 | 0.550 | 1.80518 | 25.46 |
| 11 | −92.685 | 0.631 | | |
| 12 | −104.785 | 4.050 | 1.77250 | 49.62 |
| 13 | −9.319 | 0.615 | | |
| 14* | 20.936 | 3.251 | 1.62263 | 58.16 |
| 15* | −23.588 | 13.620 | | |
| 16 (EP) | INF | | | |

The aspherical coefficients of the lens surfaces of the observation optical system of the first example are illustrated in following Table 3. Note that, in the following description (including the lens data in the table), a power of 10 (2.5× $10^{−02}$, for example) is expressed using E (for example, 2.5E−02).

TABLE 3

| |
|---|
| 14TH SURFACE |
| K = −0.003, A4 = −1.800E−04, A6 = 2.7967E−07, A8 = 2.8092E−08 |
| 15TH SURFACE |
| K = 0.877, A4 = −9.4136E−05, A6 = 1.6040E−06, A8 = −1.8415E−09, A10 = 2.8514E−10 |

FIG. 1A is a cross-sectional view of an observation optical system 10A and the like according to the first example. The observation optical system 10A of the first example is provided with an objective optical system LO, an inversion optical system PR, and an eyepiece optical system LE. The inversion optical system PR is arranged immediately posterior to the objective optical system LO, that is, on a pupil EP side of the objective optical system LO. The objective optical system LO is formed of a first A lens L1A having a negative power and a second A lens L2A having a positive power in this order from an object side. The first A lens and second A lens L1A and L2A are made a cemented lens CS. The eyepiece optical system LE is formed of a first B lens L1B having a positive power, a second B lens L2B having a positive power, a third B lens L3B having a negative power, and a fourth B lens L4B having a positive power in this order from the pupil EP side. Note that a line represented by a symbol EP indicates a pupil position in design (this is similar in the following examples).

FIGS. 1B to 1D illustrate spherical aberration, astigmatism, and distortion, respectively, regarding a virtual image observed by the observation optical system 10A illustrated in FIG. 1A. Note that, in a spherical aberration diagram and an astigmatism diagram, diopter is plotted along the abscissa, and −1 (diopter) is made reference diopter. Also, in the spherical aberration diagram, an incident pupil diameter is plotted along the ordinate, and in the astigmatism diagram and the distortion aberration diagram, a field of view is plotted along the ordinate. In the spherical aberration diagram, aberration characteristics are illustrated regarding a C-line, an e-line, and a g-line (an aberration notation method is similar in second and subsequent examples).

Second Example

Optical specification values of an observation optical system of a second example are illustrated in following Table 4.

TABLE 4

| | |
|---|---|
| DIOPTER (dpt) | −1.0 |
| OBJECT DISTANCE (mm) | 390 |
| PUPIL RADIUS H (mm) | 1.75 |

Data of a lens surface and the like of the observation optical system of the second example are illustrated in following Table 5.

TABLE 5

| Surf. N | R (mm) | T (mm) | n | vd |
|---|---|---|---|---|
| 1 | 25.813 | 1.000 | 1.85025 | 30.05 |
| 2 | 15.493 | 3.784 | 1.56883 | 56.04 |
| 3 | −79.427 | 16.884 | | |
| 4 | INF | 29.970 | 1.69895 | 30.05 |
| 5 | INF | 0.520 | | |

TABLE 5-continued

| Surf. N | R (mm) | T (mm) | n | vd |
|---|---|---|---|---|
| 6 | INF | 16.330 | 1.69895 | 30.05 |
| 7 | INF | 1.000 | | |
| 8 | 97.431 | 2.047 | 1.84666 | 23.78 |
| 9 | −14.304 | 4.927 | | |
| 10 | −5.116 | 0.400 | 1.84666 | 23.78 |
| 11 | −111.619 | 1.560 | | |
| 12 | −22.672 | 4.300 | 1.77250 | 49.62 |
| 13 | −7.734 | 0.500 | | |
| 14* | 10.069 | 3.300 | 1.77250 | 49.47 |
| 15* | 128.996 | 14.550 | | |
| 16 (EP) | INF | | | |

Aspherical coefficients of the lens surfaces of the observation optical system of the second example are illustrated in following Table 6.

TABLE 6

14TH SURFACE

K = 0.695, A4 = −2.2479E−05, A6 = −5.1341E−06,
A8 = −3.3062E−08, A10 = −1.8612E−09

15TH SURFACE

K = 1.000, A4 = 3.0070E−04, A6 = −6.7580E−06,
A8 = −1.1474E−07, A10 = 1.3807E−09

FIG. 2A is a cross-sectional view of an observation optical system 10B and the like according to the second example. The observation optical system 10B of the second example is provided with an objective optical system LO, an inversion optical system PR, and an eyepiece optical system LE. The objective optical system LO is formed of a first A lens L1A having a negative power, a second A lens L2A having a positive power, and a third A lens L3A having a positive power in this order from an object side. The first A lens and second A lens L1A and L2A are made a cemented lens CS. The inversion optical system PR is provided inside the objective optical system LO, more specifically, between the second A lens L2A and the third A lens L3A. The eyepiece optical system LE is formed of a first B lens L1B having a positive power, a second B lens L2B having a positive power, and a third B lens L3B having a negative power in this order from a pupil EP side.

Figure 2B:
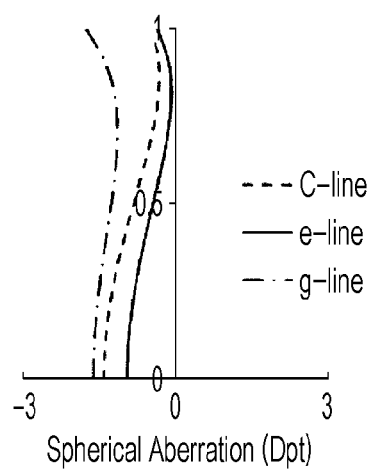
FIGS. 2B to 2D are aberration diagrams of the observation optical system of the second example.
Figure 2C:
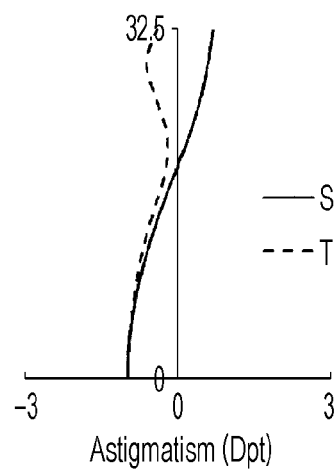
Figure 2D:
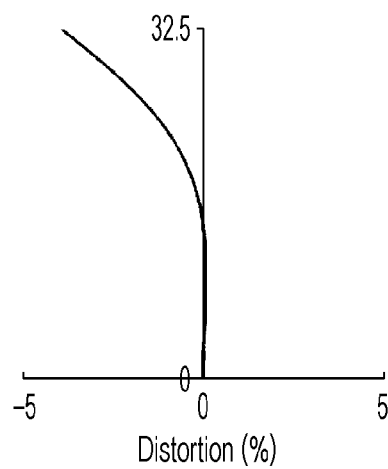

FIGS. 2B to 2D illustrate spherical aberration, astigmatism, and distortion, respectively, regarding a virtual image observed by the observation optical system 10B illustrated in FIG. 2A.

Third Example

Optical specification values of an observation optical system of a third example are illustrated in following Table 7.

TABLE 7

| DIOPTER (dpt) | −1.0 |
|---|---|
| OBJECT DISTANCE (mm) | 390 |
| PUPIL RADIUS H (mm) | 2.0 |

Data of a lens surface and the like of the observation optical system of the third example are illustrated in following Table 8.

TABLE 8

| Surf. N | R (mm) | T (mm) | n | vd |
|---|---|---|---|---|
| 1 | 30.884 | 0.907 | 1.90366 | 31.32 |
| 2 | 15.535 | 4.347 | 1.74330 | 49.22 |
| 3 | −237.507 | 17.171 | | |
| 4 | INF | 31.970 | 1.75520 | 27.53 |
| 5 | INF | 0.520 | | |
| 6 | INF | 16.330 | 1.75520 | 27.53 |
| 7 | INF | 0.281 | | |
| 8 | 26.393 | 1.885 | 1.90366 | 31.32 |
| 9 | −15.837 | 3.730 | | |
| 10 | −5.500 | 0.400 | 1.84666 | 23.78 |
| 11 | 34.930 | 2.433 | | |
| 12 | −24.667 | 4.400 | 1.77250 | 49.62 |
| 13 | −7.800 | 0.100 | | |
| 14* | 8.165 | 3.226 | 1.72903 | 54.04 |
| 15* | 25.261 | 14.974 | | |
| 16 (EP) | INF | | | |

Aspherical coefficients of the lens surfaces of the observation optical system of the third example are illustrated in following Table 9.

TABLE 9

14TH SURFACE

K = −0.042, A4 = 1.3522E−04, A6 = −8.8495E−06,
A8 = 2.2849E−08, A10 = −3.0897E−09

15TH SURFACE

K = −2.092, A4 = 5.0981E−04, A6 = −1.8507E−05,
A8 = 2.7535E−08, A10 = 3.6181E−10

Figure 3A:
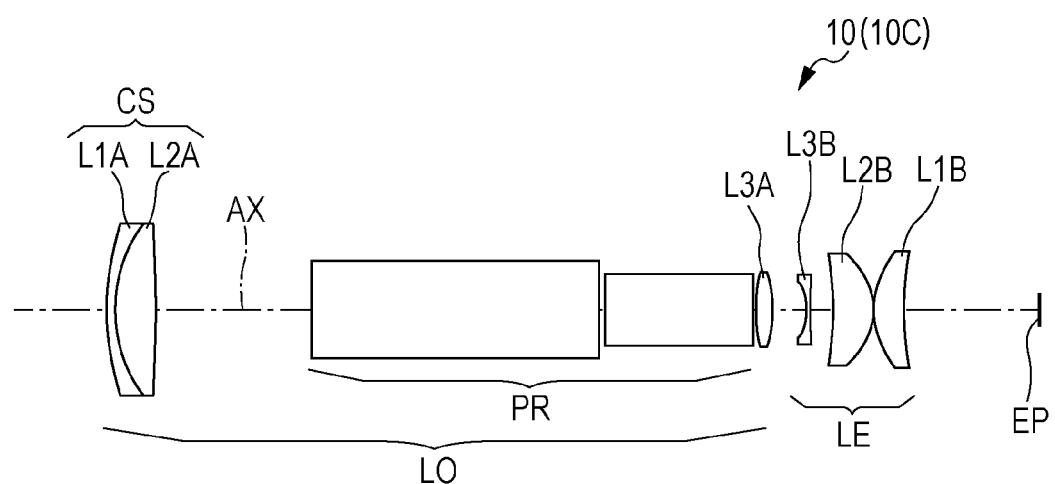
FIG. 3A is a cross-sectional view illustrating an observation optical system and the like of a third example.

FIG. 3A is a cross-sectional view of an observation optical system 10C and the like according to the third example. The observation optical system 10C of the third example is provided with an objective optical system LO, an inversion optical system PR, and an eyepiece optical system LE. The objective optical system LO is formed of a first A lens L1A having a negative power, a second A lens L2A having a positive power, and a third A lens L3A having a positive power in this order from an object side. The first A lens and second A lens L1A and L2A are made a cemented lens CS. The inversion optical system PR is provided inside the objective optical system LO, more specifically, between the second A lens L2A and the third A lens L3A. The eyepiece optical system LE is formed of a first B lens L1B having a positive power, a second B lens L2B having a positive power, and a third B lens L3B having a negative power in this order from a pupil EP side.

Figure 3B:
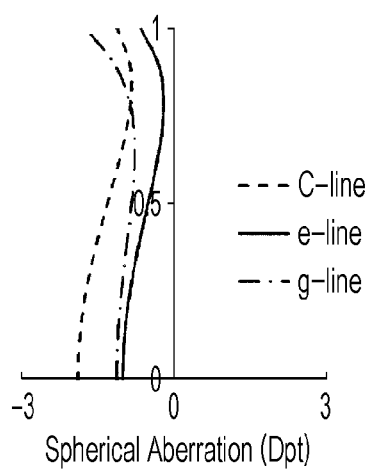
FIGS. 3B to 3D are aberration diagrams of an observation optical system of the third example.
Figure 3C:
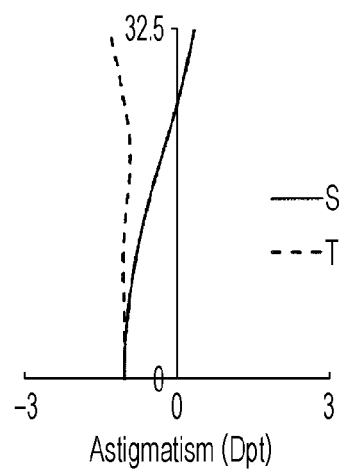
Figure 3D:
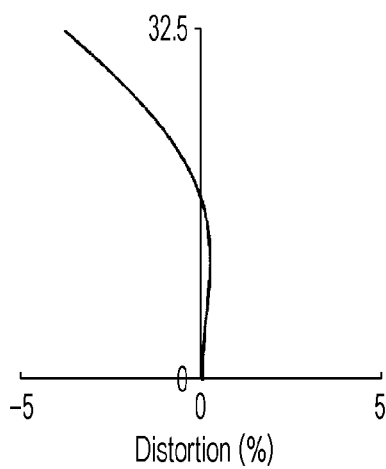

FIGS. 3B to 3D illustrate spherical aberration, astigmatism, and distortion, respectively, regarding a virtual image observed by the observation optical system 10C illustrated in FIG. 3A.

Example 4

Optical specification values of an observation optical system of a fourth example are illustrated in following Table 10.

TABLE 10

| DIOPTER (dpt) | −1.0 |
|---|---|
| OBJECT DISTANCE (mm) | 390 |
| PUPIL RADIUS H (mm) | 2.0 |

Data of a lens surface and the like of the observation optical system of the fourth example are illustrated in following Table 11.

TABLE 11

| Surf. N | R (mm) | T (mm) | n | vd |
|---|---|---|---|---|
| 1 | 46.197 | 4.110 | 1.71300 | 53.94 |
| 2 | −23.205 | 0.986 | 1.90366 | 31.32 |
| 3 | −62.000 | 17.310 | | |
| 4 | INF | 32.971 | 1.64769 | 33.84 |
| 5 | INF | 0.500 | | |
| 6 | INF | 16.330 | 1.64769 | 33.84 |
| 7 | INF | 0.400 | | |
| 8 | 48.241 | 1.512 | 1.84666 | 23.78 |
| 9 | −22.837 | 5.783 | | |
| 10 | −5.500 | 0.700 | 1.78472 | 25.72 |
| 11 | 128.145 | 0.905 | | |
| 12 | −35.199 | 4.300 | 1.77250 | 49.62 |
| 13 | −7.800 | 0.100 | | |
| 14* | 9.578 | 3.091 | 1.77250 | 49.47 |
| 15* | 56.117 | 14.500 | | |
| 16 (EP) | INF | | | |

Aspherical coefficients of the lens surfaces of the observation optical system of the fourth example are illustrated in following Table 12.

TABLE 12

14TH SURFACE

K = 0.717, A4 = −1.2428E−04, A6 = −1.5998E−05,
A8 = 1.8557E−07, A10 = −1.1365E−09,
A12 = −6.0427E−11

15TH SURFACE

K = −5.000, A4 = 1.7648E−04, A6 = −2.7253E−05,
A8 = 9.1781E−07, A10 = −1.8888E−08,
A12 = 1.4276E−10

Figure 4A:
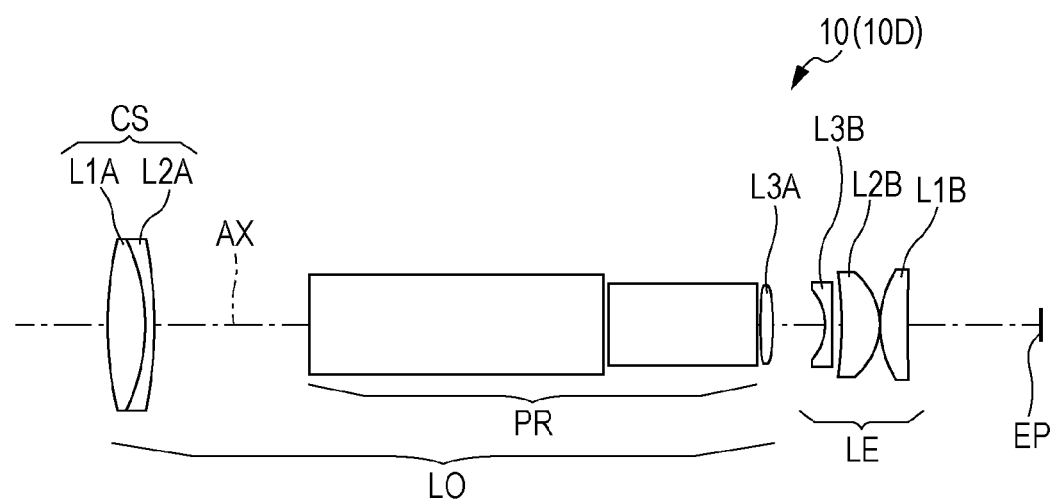
FIG. 4A is a cross-sectional view illustrating an observation optical system and the like of a fourth example.

FIG. 4A is a cross-sectional view of an observation optical system 10D and the like according to the fourth example. The observation optical system 10D of the fourth example is provided with an objective optical system LO, an inversion optical system PR, and an eyepiece optical system LE. The objective optical system LO is formed of a first A lens L1A having a positive power, a second A lens L2A having a negative power, and a third A lens L3A having a positive power in this order from an object side. The first A lens and second A lens L1A and L2A are made a cemented lens CS. The inversion optical system PR is provided inside the objective optical system LO, more specifically, between the second A lens L2A and the third A lens L3A. The eyepiece optical system LE is formed of a first B lens L1B having a positive power, a second B lens L2B having a positive power, and a third B lens L3B having a negative power in this order from a pupil EP side.

Figure 4B:
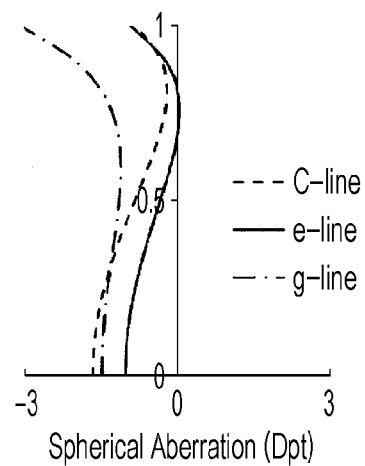
FIGS. 4B to 4D are aberration diagrams of the observation optical system of the fourth example.
Figure 4C:
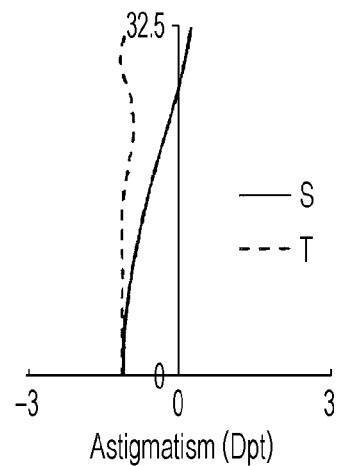
Figure 4D:
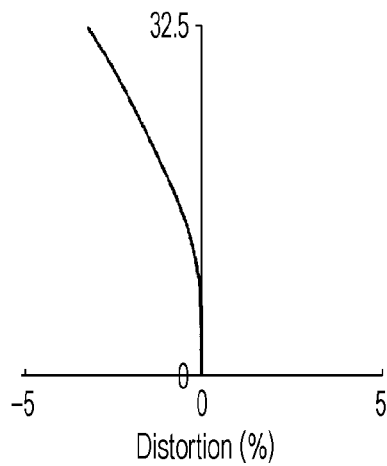

FIGS. 4B to 4D illustrate spherical aberration, astigmatism, and distortion, respectively, regarding a virtual image observed by the observation optical system 10D illustrated in FIG. 4A.

Following Table 13 summarizes the values of the first to fourth examples corresponding to conditional expressions (1) to (5) for reference.

TABLE 13

| | FIRST EXAMPLE | SECOND EXAMPLE | THIRD EXAMPLE | FOURTH EXAMPLE |
|---|---|---|---|---|
| CONDITIONAL EXPRESSION (1) | 1.65 | 2.17 | 2.39 | 1.97 |
| CONDITIONAL EXPRESSION (2) | 2.85 | 2.83 | 2.77 | 2.91 |

TABLE 13-continued

| | FIRST EXAMPLE | SECOND EXAMPLE | THIRD EXAMPLE | FOURTH EXAMPLE |
|---|---|---|---|---|
| CONDITIONAL EXPRESSION (3) | 1.72825 | 1.69895 | 1.75520 | 1.64769 |
| CONDITIONAL EXPRESSION (4) | 28.32 | 30.05 | 27.53 | 33.84 |
| CONDITIONAL EXPRESSION (5) | 4.0 | 6.1 | 7.1 | 5.7 |

Although the observation optical systems according to the embodiment are described above, the observation optical system according to the present invention is not limited to those illustrated above. For example, in the above-described embodiment, a cover member having light transmittance may also be provided outside the lens the closest to the object and the lens the closest to the pupil EP of the observation optical system 10 in consideration of scratch resistance, chemical resistance and the like.

Also, in the above-described embodiment, it is possible to arrange a lens or the like having substantially no power in the objective optical system LO and the eyepiece optical system LE.

Also, in the above-described embodiment, the lenses except the lens the closest to the object and the lens the closest to the pupil EP are not limited to be made of glass, and may be made of resin.

Also, in the above-described embodiment, a parallel flat plate F may also be provided between the eyepiece optical system LE and the pupil EP. The parallel flat plate F may be a diopter adjusting lens in a case where the observation optical system 10 is of the eyeglass type. Note that, in a case where the observation optical system 10 is used for applications requiring wavelength selection, the parallel flat plate F may be coated with wavelength selection coating.

The invention claimed is:

1. An observation optical system comprising:
   an objective optical system;
   an inversion optical system provided in the objective optical system or immediately posterior to the objective optical system to invert an inverted image to an erected image; and
   an eyepiece optical system arranged so as to be the closest to a pupil to observe the erected image,
   the observation optical system satisfying following conditional expressions:

$$1.6 < f \times N/L < 2.5 \quad (1), \text{ and}$$

$$|D/H| < 3 \quad (2)$$

wherein,
   f: focal length of the objective optical system,
   N: refractive index on a d-line of the inversion optical system,
   L: optical path length of the inversion optical system,
   D: maximum height from an optical axis of an incident light ray on an object side of the inversion optical system, and
   H: exit pupil radius.

2. The observation optical system according to claim 1, wherein the eyepiece optical system includes a positive lens, a positive lens, and a negative lens in this order from the pupil side.

3. The observation optical system according to claim 2, satisfying following conditional expressions:

$$1.64 < Nd < 1.85 \quad (3), \text{ and}$$

$$20 < vd < 34 \quad (4)$$

wherein,
Nd: refractive index of a glass material used for the inversion optical system with respect to a d-line, and
vd: Abbe number of the inversion optical system.

4. The observation optical system according to claim 2, wherein, in the eyepiece optical system, the lens the closest to the pupil includes an aspheric surface.

5. The observation optical system according to claim 2, satisfying following conditional expressions:

$$4 < f/f_R < 7.5 \quad (5)$$

wherein,
f: focal length of the objective optical system, and
$f_R$: focal length of the eyepiece optical system.

6. The observation optical system according to claim 1, satisfying following conditional expressions:

$$1.64 < Nd < 1.85 \quad (3), \text{ and}$$

$$20 < vd < 34 \quad (4)$$

wherein,
Nd: refractive index of a glass material used for the inversion optical system with respect to a d-line, and
vd: Abbe number of the inversion optical system.

7. The observation optical system according to claim 6, wherein, in the eyepiece optical system, the lens the closest to the pupil includes an aspheric surface.

8. The observation optical system according to claim 6, satisfying following conditional expressions:

$$4 < f/f_R < 7.5 \quad (5)$$

wherein,
f: focal length of the objective optical system, and
$f_R$: focal length of the eyepiece optical system.

9. The observation optical system according to claim 1, wherein, in the eyepiece optical system, the lens the closest to the pupil includes an aspheric surface.

10. The observation optical system according to claim 9, satisfying following conditional expressions:

$$4 < f/f_R < 7.5 \quad (5)$$

wherein,
f: focal length of the objective optical system, and
$f_R$: focal length of the eyepiece optical system.

11. The observation optical system according to claim 1, satisfying following conditional expressions:

$$4 < f/f_R < 7.5 \quad (5)$$

wherein,
f: focal length of the objective optical system, and
$f_R$: focal length of the eyepiece optical system.

* * * * *